US008403500B2

(12) United States Patent
Todoroki

(10) Patent No.: US 8,403,500 B2
(45) Date of Patent: Mar. 26, 2013

(54) PROJECTOR AND METHOD OF CONTROLLING PROJECTOR

(75) Inventor: Akinari Todoroki, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 36 days.

(21) Appl. No.: 13/229,873

(22) Filed: Sep. 12, 2011

(65) Prior Publication Data

US 2012/0062855 A1    Mar. 15, 2012

(30) Foreign Application Priority Data

Sep. 15, 2010   (JP) .................. 2010-206410

(51) Int. Cl.
*G03B 21/14* (2006.01)
(52) U.S. Cl. ......................... 353/69; 348/335
(58) Field of Classification Search ............. 353/69, 353/70, 85, 121; 348/335–340; 382/293
See application file for complete search history.

(56) References Cited

U.S. PATENT DOCUMENTS 5,818,527 A * 10/1998 Yamaguchi et al. .......... 348/335
2010/0103385 A1    4/2010 Kubota

FOREIGN PATENT DOCUMENTS

JP    2010-109585 A    5/2010
JP    2010-128102 A    6/2010

* cited by examiner

*Primary Examiner* — Seung C Sohn
(74) *Attorney, Agent, or Firm* — ALG Intellectual Property, LLC

(57) ABSTRACT

A projector includes a projection unit, an imaging unit, a correction control unit acquiring first correction information based on a first captured image acquired by capturing a distortion detection image projected onto a projection surface, and a distortion correction unit performing distortion correction based on the first correction information. The correction control unit, in a case where second distortion correction needs to be performed after the distortion correction unit, performs first distortion correction based on the first correction information, allows the projection unit to project the distortion detection image without transforming the distortion detection image by using the distortion correction unit allows the imaging unit to capture the projected distortion detection image so as to be acquired as a second captured image, acquires second correction information based on the second captured image, and allows the distortion correction unit to perform the second distortion correction based on the second correction information.

14 Claims, 11 Drawing Sheets

PROJECTOR AND METHOD OF CONTROLLING PROJECTOR

The entire disclosure of Japanese Patent Application No. 2010-206410 filed Sep. 15, 2010 is expressly incorporated by reference herein.

BACKGROUND

1. Technical Field

The present invention relates to a projector that projects an image on a projection surface and a method of controlling a projector.

2. Related Art

In a case where an image is projected onto a projection surface such as a screen by a projector, it is known that an image formed on the projection surface is distorted in accordance with a projection angle of the projector. A general projector has a trapezoidal distortion correction function for transforming a projected image into a correct shape on the projection surface. In addition, for example, there is a projector that automatically performs trapezoidal distortion correction by projecting a predetermined pattern on a projection surface, capturing an image of the projection surface onto which the pattern is projected, and detecting the deformation of the pattern in the captured image (for example, see JP-A-2010-128102).

However, in a case where the trapezoidal distortion becomes prominent again due to a movement of the projector or a change in the direction of the projector after the trapezoidal distortion correction, the trapezoidal distortion correction is performed again. In such a case, it may be difficult to maintain the accuracy and the speed of correction that is equivalent to those of a case where the trapezoidal distortion correction is performed for the first time. In other words, in the trapezoidal distortion correction performed first time, commonly, trapezoidal distortion occurs in an image projected in a rectangular shape, and accordingly, the projected image is transformed such that the trapezoidal distortion is offset with reference to a rectangular state. In order to realize the transformation, in a display unit included in the projector, an image is displayed in a scale smaller than a displayable area. Accordingly, in the trapezoidal distortion correction performed for the second time and after that, trapezoidal distortion is detected based on an image displayed in a scale smaller than that in the trapezoidal distortion correction performed for the first time. Therefore, the accuracy of a process for calculating the amount of correction and the correction direction in the trapezoidal distortion correction or the speed of the process may not be equivalent to those of the trapezoidal distortion correction performed for the first time.

SUMMARY

An advantage of some aspects of the invention is that it provides a projector, which has a trapezoidal distortion correction function, capable of performing trapezoidal distortion correction with high accuracy at high speed even after the trapezoidal distortion correction is performed once.

An aspect of the invention is directed to a projector including: a projection unit that projects an image toward a projection surface; an imaging unit that captures the image projected onto the projection surface by the projection unit; a correction control unit that allows the imaging unit to capture a distortion detection image projected onto the projection surface by the projection unit and acquires first correction information based on the acquired captured image; and a distortion correction unit that performs distortion correction by transforming the image projected by the projection unit based on the first correction information acquired by the correction control unit. The correction control unit, in a case where second distortion correction needs to be performed after the distortion correction unit performs first distortion correction based on the first correction information, allows the projection unit to project the distortion detection image without transforming the distortion detection image by using the distortion correction unit, allows the imaging unit to capture the projected distortion detection image so as to be acquired as a second captured image, acquires second correction information based on the second captured image, and allows the distortion correction unit to perform the second distortion correction based on the second correction information.

According to the aspect of the invention, the projector having a function of projecting an image on the projection surface, capturing the image, and performing trapezoidal distortion correction based on the captured image, in a case where additional distortion correction needs to be performed after correction is performed by using the trapezoidal distortion correction function, acquires correction information again by projecting a distortion detection image without transforming the distortion detection image. Accordingly, the correction information for the trapezoidal distortion correction can be acquired again without being influenced by the trapezoidal distortion correction that has been already performed. Compared to a case where an image is additionally transformed by using the image transformed for the trapezoidal distortion correction as a reference, the process is simple, and accordingly, the trapezoidal distortion correction can be performed with high accuracy at high speed. Accordingly, in a case where additional correction needs to be performed after the first correction is performed, the correction information for trapezoidal distortion correction is acquired with high accuracy at high speed, and the trapezoidal distortion correction can be performed based on the new correction information.

According to the aspect of the invention, the projector that performs the distortion correction by transforming an image displayed in a display area of the display unit may perform a re-correction process by displaying a distortion detection image that is not transformed in the display area, and accordingly, the re-correction process can be performed through a simple process. In addition, in a case where the display area of the image is decreased by transforming the image displayed in the display area by using the distortion correction unit, the display area of the distortion detection image is not decreased in the re-correction process, whereby the trapezoidal distortion correction can be performed with higher accuracy.

In the above-described configuration, the correction control unit, in the re-correction process, may display the distortion detection image on an approximately entire face of the display area of the display unit without transforming the distortion detection image by using the trapezoidal distortion correction unit and project the distortion detection image onto the projection surface.

In such a case, since the distortion detection image is projected in a large scale using the almost entire face of the display area of the display unit in the re-correction process, the trapezoidal distortion correction can be performed with higher accuracy. Particularly, in a case where the display area of the image is decreased by transforming the image displayed in the display area by using the trapezoidal distortion correction unit, not by decreasing the display area of the distortion detection image, the correction accuracy can be expected to be improved.

In addition, according to the aspect of the invention, a user can be appropriately notified that the re-correction process is in the middle of the process, whereby the user convenience can be improved. In addition, since the distortion detection image is projected in the state in which a notification display for notification of the re-correction process is corrected, the notification can be reliably performed with high visibility.

In addition, according to the aspect of the invention, the first and second distortion detection images may be overlapped with a predetermined image so as to be projected and captured, and the correction information of the trapezoidal distortion correction may be acquired based on a difference thereof. Accordingly, the first correction information and the second correction information can be acquired while projecting an image other than the detection images. Particularly, in a case where the second correction information is acquired, the trapezoidal distortion correction has been already performed, and an image is in the middle of the projection process. In such a case, by acquiring the second correction information using the image that is currently projected, the projection of the image does not need to end. Accordingly, the user convenience is improved, and user's feeling of discomfort or unpleasant sensation does not incur. In addition, since the influence of the color of the projection surface can be excluded, for example, in a case where the distortion detection image is projected so as to exceed the screen, the captured image of the exceeded portion can be used, whereby the trapezoidal distortion correction can be performed with higher accuracy.

In addition, according to the aspect of the invention, the projector that has performed the trapezoidal distortion correction may perform a re-correction process in accordance with a user operation or automatically in a case where there is a high probability that a trapezoidal distortion occurs. Therefore, by appropriately performing the re-correction process, an image without any distortion can be projected.

Furthermore, according to the aspect of the invention, the correction information of the trapezoidal distortion correction can be accurately acquired by performing the re-correction process even when a moving image is in the middle of the projection process.

Another aspect of the invention is directed to a method of controlling a projector that projects an image toward a projection surface. The method includes: projecting a distortion detection image onto the projection surface; acquiring a first captured image by capturing the distortion detection image projected onto the projection surface; acquiring first correction information based on the captured image; performing first distortion correction, in which the image projected by the projector is transformed, based on the first correction information; and projecting the distortion detection image without transforming the distortion detection image, capturing the projected distortion detection image so as to be acquired as a second captured image, acquiring second correction information based on the second captured image, and performing second distortion correction based on the second correction information, in a case where the second distortion correction needs to be performed after performing the first distortion correction based on the first correction information.

According to the aspect of the invention, the projector having a function of projecting an image on the projection surface, capturing the image, and performing trapezoidal distortion correction based on the captured image, in a case where additional distortion correction needs to be performed after correction is performed by using the trapezoidal distortion correction function, acquires correction information again by projecting a distortion detection image without transforming the distortion detection image. Accordingly, the correction information for the trapezoidal distortion correction can be acquired again without being influenced by the trapezoidal distortion correction that has been already performed. Compared to a case where an image is additionally transformed by using the image transformed for the trapezoidal distortion correction as a reference, the process is simple, and accordingly, the trapezoidal distortion correction can be performed with high accuracy at high speed. Accordingly, in a case where additional correction needs to be performed after the first correction is performed, the correction information for trapezoidal distortion correction is acquired with high accuracy at high speed, and the trapezoidal distortion correction can be performed based on the new correction information.

According to the aspects of the invention, in a case where distortion correction is additionally performed in the state in which distortion correction is performed, correction information of the distortion correction can be acquired through a simple process without being influenced by the distortion correction that has already been performed, and whereby the distortion correction can be performed with high accuracy at high speed.

BRIEF DESCRIPTION OF THE DRAWINGS

The invention will be described with reference to the accompanying drawings, wherein like numbers reference like elements.

FIG. 4A shows a first distortion detection image, and FIG. 4B shows a second distortion detection image.

FIG. 5A shows a still image, FIG. 5B shows a first overlapping image, FIG. 5C shows a second overlapping image, and FIG. 5D shows a differential image.

FIG. 6A shows a first captured image, FIG. 6B shows a second captured image, and FIG. 6C shows a measurement image.

FIG. 8A shows a still image, FIG. 8B shows a re-correction first image, FIG. 8C shows a re-correction second image, and FIG. 8D shows a differential image.

FIG. 9A shows a re-correction first captured image, FIG. 9B shows a re-correction second captured image, and FIG. 9C shows a measurement image.

FIG. 10A shows a still image, FIG. 10B shows a re-correction first image, FIG. 10C shows a re-correction second image, and FIG. 10D shows a differential image.

FIG. 11A shows a re-correction first captured image, FIG. 11B shows a re-correction second captured image, and FIG. 11C shows a measurement image.

DESCRIPTION OF EXEMPLARY EMBODIMENTS

Hereinafter, an embodiment of the invention will be described with reference to the accompanying drawings.

Figure 1:
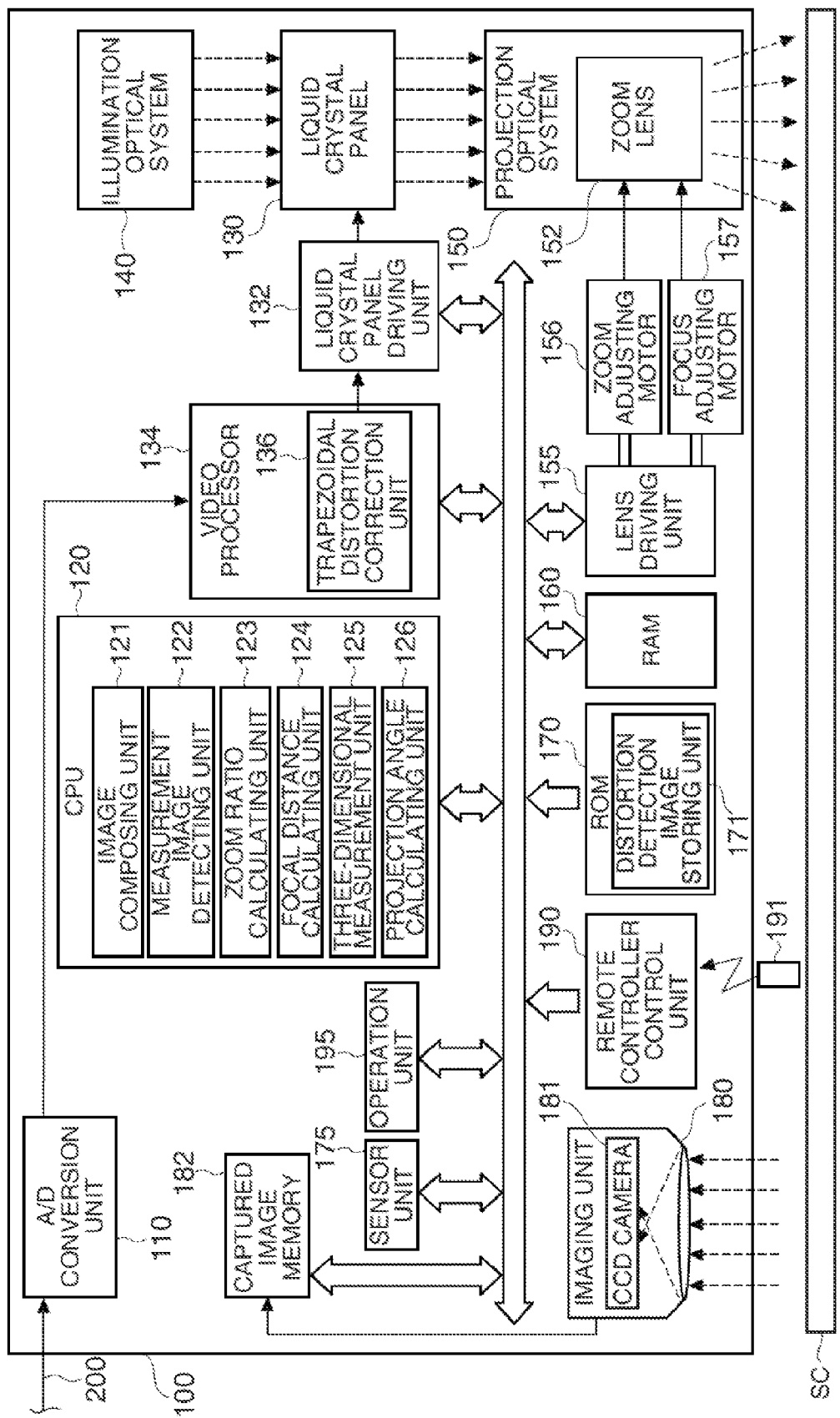
FIG. 1 is a block diagram showing the configuration of a projector according to an embodiment of the invention.

FIG. 1 is a block diagram showing the entire configuration of a projector 100 according to an embodiment of the invention. An image signal is input to the projector 100 from a video source (not shown in the figure) that is stored in a built-in storage device or an external image supplying device (not shown in the figure) such as a personal computer or various video players. The projector 100 projects light modulated based on an input image signal onto a projection surface such as a screen SC, and thereby displaying an image (hereinafter, referred to as a "projection image"). In this embodiment, the screen SC is substantially erected, and the screen surface has a rectangular shape. The image input to the projector 100 may be either a moving image (video) or a still image. The projector 100 can project the video onto the screen SC or continuously project a still image onto the screen SC. In the embodiment described below, a case will be described as an example in which a video is projected based on a video signal that is input from the outside.

The projector 100 is basically configured by an optical system that forms an optical image and an image processing system that electrically processes a video signal. The optical system serving as a projection unit is configured by an illumination optical system 140, a liquid crystal panel 130, and a projection optical system 150. The illumination optical system 140 includes a light source that is configured by a xenon lamp, an ultrahigh pressure mercury lamp, an LED, or the like. The illumination optical system 140 may include a reflection mirror and an auxiliary reflection mirror that guide light emitted by the light source to the liquid crystal panel 130. Alternatively, the illumination optical system 140 may include a lens group (not shown) used for improving the optical characteristics of the projection light, a polarizing plate, a dimming device that reduces light on a path through which light emitted by the light source reaches the liquid crystal panel 130, and the like.

The liquid crystal panel 130 (display unit) receives a signal from the image processing system to be described later and forms an image on a panel face. In order to perform color projection, the liquid crystal panel 130 is configured by three liquid crystal panels corresponding to three primary colors RGB. Accordingly, light transmitted from the illumination optical system 140 is separated into color beams of three colors RGB, and each color beam is incident to a corresponding liquid crystal panel. The color beams that are modulated by passing the liquid crystal panels are composed by a composition optical system such as a cross-dichroic prism, and the composed light is projected to the projection optical system 150.

In the projection optical system 150, a zoom lens 152 that scales an image to be projected and adjusts focus, a zoom adjusting motor 156 that adjusts the degree of zoom, and a focus adjusting motor 157 that adjusts focus are included. The projection optical system 150 receives light modulated by the liquid crystal panel 130 and forms a projection image on a screen SC by using the zoom lens 152. By adjusting the position of the lens and the like using the zoom adjusting motor 156 and the focus adjusting motor 157, the zoom lens 152 performs zoom adjusting in which a projection image formed on the screen SC is scaled and focus adjusting in which a projection image is appropriately imaged on the screen SC.

The image processing system is mainly configured by a CPU 120 that integrally controls the entire projector 100 and a video processor 134 and includes: an A/D conversion unit 110; a liquid crystal panel driving unit 132; a lens driving unit 155; a RAM 160; a ROM 170 that includes a distortion detection image storing unit 171; a sensor unit 175 that detects the movement of the projector 100; an imaging unit 180 that includes a CCD camera 181; a captured image memory 182; a remote controller control unit 190; a remote controller 191; an operation unit 195; and the like. The elements configuring the image processing system are interconnected through a bus 102.

The A/D conversion unit 110 is a device that performs A/D conversion for an input signal input from the above-described external image supplying device through a cable 200 and outputs a converted digital signal to the video processor 134. The video processor 134 performs a process of adjusting the display statuses of an image such as the luminance, the contrast, the color density, the color shade, and the shape of a projection image for the digital signal input from the A/D conversion unit 110 and then outputs a video signal after the process to the liquid crystal panel driving unit 132. The liquid crystal panel driving unit 132 drives the liquid crystal panel 130 based on a video signal input from the video processor 134. Accordingly, a video corresponding to the video signal input to the A/D conversion unit 110 is formed on the liquid crystal panel 130, and this image is formed as a projection image on the screen SC through the projection optical system 150.

As image processing performed by the video processor 134, other than correction of the brightness, the contrast, the color shade, or the like described above, a trapezoidal distortion correction is included. In FIG. 1, a circuit that performs the trapezoidal distortion correction is illustrated as a trapezoidal distortion correction unit 136. The trapezoidal distortion correction unit 136 performs the trapezoidal distortion correction for the digital signal based on the value of a projection angle that is calculated by a projection angle calculating unit 126 to be described later included in the CPU 120.

In addition, the video processor 134 controls the display of a specific distortion detection image in the trapezoidal distortion correction. The video processor 134 may be configured by using a general-purpose processor that is sold as a trapezoidal distortion correction DSP (digital signal processor) or may be configured by a dedicated ASIC.

The CPU 120 performs image processing in the projector 100 together with the video processor 134. The CPU 120 includes an image composing unit 121, a measurement image detecting unit 122, a zoom ratio calculating unit 123, a focal distance calculating unit 124, a three-dimensional measurement unit 125, and the projection angle calculating unit 126. Each unit described above is realized by executing a specific program stored in the ROM 170 in advance by using the CPU 120. Each processing unit described above performs a process necessary for calculating a relative distance (hereinafter, referred to as a projection distance) between the projector 100 to be described later and the screen SC or a projection angle (hereinafter, referred to as projection angle of projection) that is an inclination of the screen SC with respect to the optical axis of projection light projected from the projector.

When the projection angle of projection and the projection distance are calculated based on the function of each unit, the CPU 120 outputs a signal corresponding to the projection angle of projection to the video processor 134 and outputs a signal corresponding to the projection distance to the lens driving unit 155. When the signal corresponding to the projection angle of projection is input from the CPU 120, the video processor 134 performs the trapezoidal distortion correction based on the signal. When the projection angle of projection that is an angle formed by the optical axis of the optical system of the projector 100 and the screen SC is specified, how the video is distorted can be understood. When a parameter corresponding to the projection angle of projection is set, the video processor 134, in order to correct the distortion of the projection image, corrects the image input from the A/D conversion unit 110 and outputs a video signal after correction to the liquid crystal panel driving unit 132. Based on the function of the trapezoidal distortion correction unit 136, the image displayed on the liquid crystal panel 130 is transformed so as to correct the trapezoidal distortion.

When a signal corresponding to the projection distance is input from the CPU 120, the lens driving unit 155 performs the focus adjusting by driving the focus adjusting motor 157 based on the signal. In order to perform focus adjusting, the zoom ratio of the zoom lens 152 is necessary. This zoom ratio, for example, may be calculated by the amount of driving of the zoom lens 152 that is performed by the zoom adjusting motor 156 or may be calculated based on a captured image captured by the imaging unit 180.

The RAM 160 forms a work area in which a program executed by the CPU 120 or data is temporarily stored. In addition, the video processor 134 includes a work area that is necessary for performing each process such as an adjustment process of the display status of an image that is performed by the video processor 134 as an internal RAM. In addition, the ROM 170 stores a program executed by the CPU 120 for realizing each processing unit described above, data relating to the program, and the like. Furthermore, the ROM 170 stores the distortion detection image to be described later in the distortion detection image storing unit 171.

The sensor unit 175 includes various sensors such as a gyro sensor or an acceleration sensor and converts the output values of the sensors into digital data and outputs the digital data to the CPU 120. The CPU 120 can detect the installation angle (elevation angle) of the projector 100 or the movement of the main body of the projector 100 based on the output value of the gyro sensor or the output value of the acceleration sensor that are input from the sensor unit 175.

The remote controller control unit 190 receives a wireless signal that is transmitted from the external remote controller 191 of the projector 100. The remote controller 191 includes operation section (not shown) which can be operated by a user and transmits an operation signal corresponding to the operation of the operation section as an infrared signal or a wireless signal using an electric wave of a predetermined frequency. The remote controller control unit 190 includes a reception section (not shown) that receives an infrared signal or a reception circuit (not shown) that receives a wireless signal, receives and analyzes a signal transmitted from the remote controller 191, generates a signal representing the content of the user's operation, and outputs the signal to the CPU 120.

The operation unit 195 includes operation section (not shown) and outputs an operation signal corresponding to an operation of the operation section to the CPU 120. As the operation section, there are a switch that is used for instructing power On/Off, a switch that is used for instructing the start of a trapezoidal distortion correction, a switch that is used for instructing the start of a re-correction process to be described later, and the like.

The imaging unit 180 includes the CCD camera 181 that uses a CCD as a known image sensor. The imaging unit 180 is disposed at a position at which the front face of the projector 100, that is, a direction in which the projection optical system 150 projects a video toward the screen SC can be imaged by the CCD camera 181. In the imaging unit 180, the camera direction and the image angle of the CCD camera 181 are set such that the entire projection image projected on the screen SC at a recommended projection distance at least fits into the imaging range. The CCD camera 181 includes, in addition to the CCD, a fixed focal length lens that forms an image on the CCD, a mechanism such as an automatic iris that adjusts the amount of light incident to the CCD, and a control circuit that reads out an image signal from the CCD, and the like. The automatic iris mechanism receives a signal corresponding to a value of accumulated brightness of an image transmitted from the CCD camera from the control circuit and automatically adjusts an iris (aperture) disposed in the fixed focal length lens such that the value of accumulated brightness fits into a predetermined range.

An image of which the brightness is adjusted by the automatic iris is output from the imaging unit 180 to the captured image memory 182 and is repeatedly written into a predetermined area of the captured image memory 182. When writing of an image corresponding to one screen is completed, the captured image memory 182 sequentially inverts a flag stored in a predetermined area. Accordingly, the CPU 120 can check whether or not imaging using the imaging unit 180 has completed by referring to the flag. The CPU 120 accesses the captured image memory 182 while referring to the flag, and thereby acquiring a needed captured image.

Subsequently, the operation of the projector 100 will be described.

Figure 2:
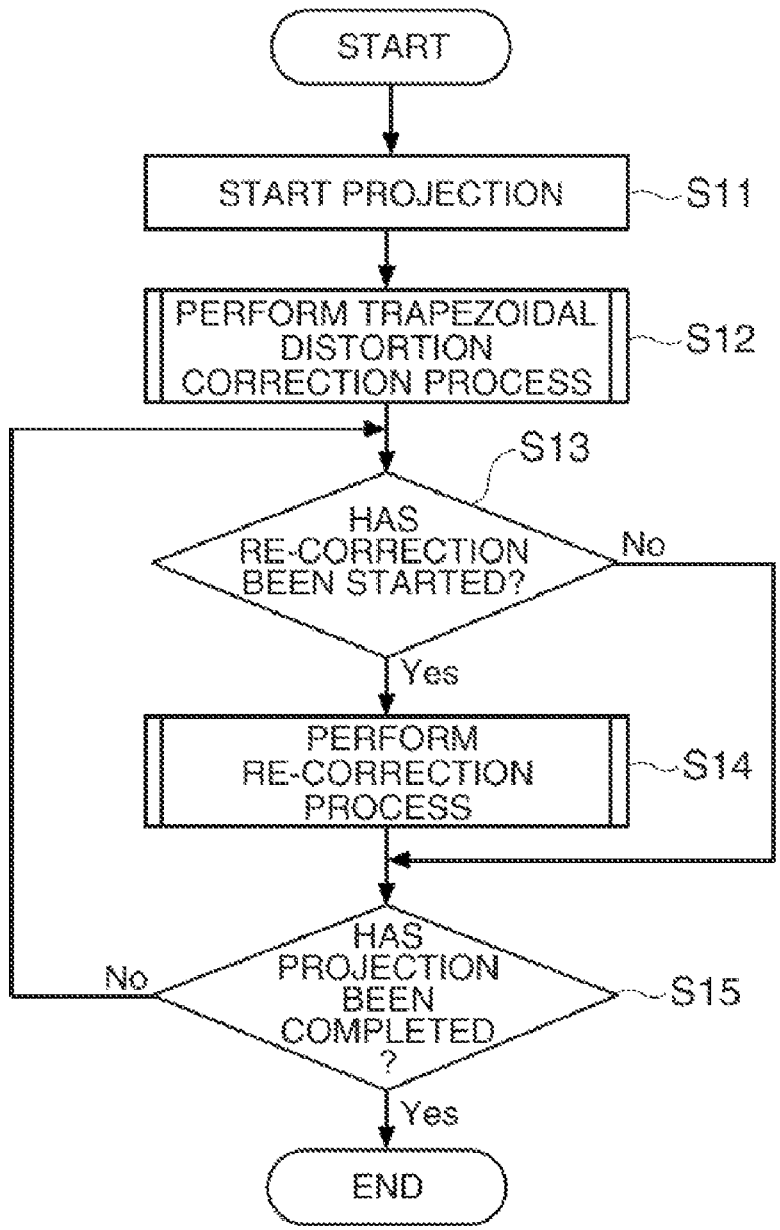
FIG. 2 is a flowchart showing the operation of the projector.

FIG. 2 is a flowchart showing the operation of the projector 100. When the operation shown in FIG. 2 is performed, the CPU 120 serves as a correction control unit.

As shown in FIG. 2, when projection of a projection image is started based on a video signal input from the outside (Step S11), the projector 100 performs a trapezoidal distortion correction process automatically after the start of the projection or in accordance with an operation of the operation section of the remote controller 191 or the operation unit 195 (Step S12). By performing the trapezoidal distortion correction process, the deformation of the projection image projected onto the screen SC due to the projection angle of projection of the projector 100 is corrected, so that the projection image has an approximately original shape.

Thereafter, the projector 100 monitors whether or not a condition for starting a re-correction process is satisfied (Step S13). As examples of the condition for starting the re-correction process, there are reception of an instruction for starting the re-correction process through an operation of the operation section of the remote controller 191 or the operation unit 195, detection of the movement of the projector 100 of which amount is equal to or more than a predetermined amount by using the CPU 120 based on the output value of the gyro sensor or the acceleration sensor that is included in the sensor unit 175, and the like. The projector 100, based on the function of the CPU 120, performs normal projection until the condition for starting a re-correction process is satisfied and performs the re-correction process in a case where the condition for starting a re-correction process is satisfied (Step S14).

Thereafter, until the projection is completed, the projector 100 monitors whether or not the condition for starting a re-correction process is satisfied and performs the re-correction process any number of times as is necessary.

Figure 3:
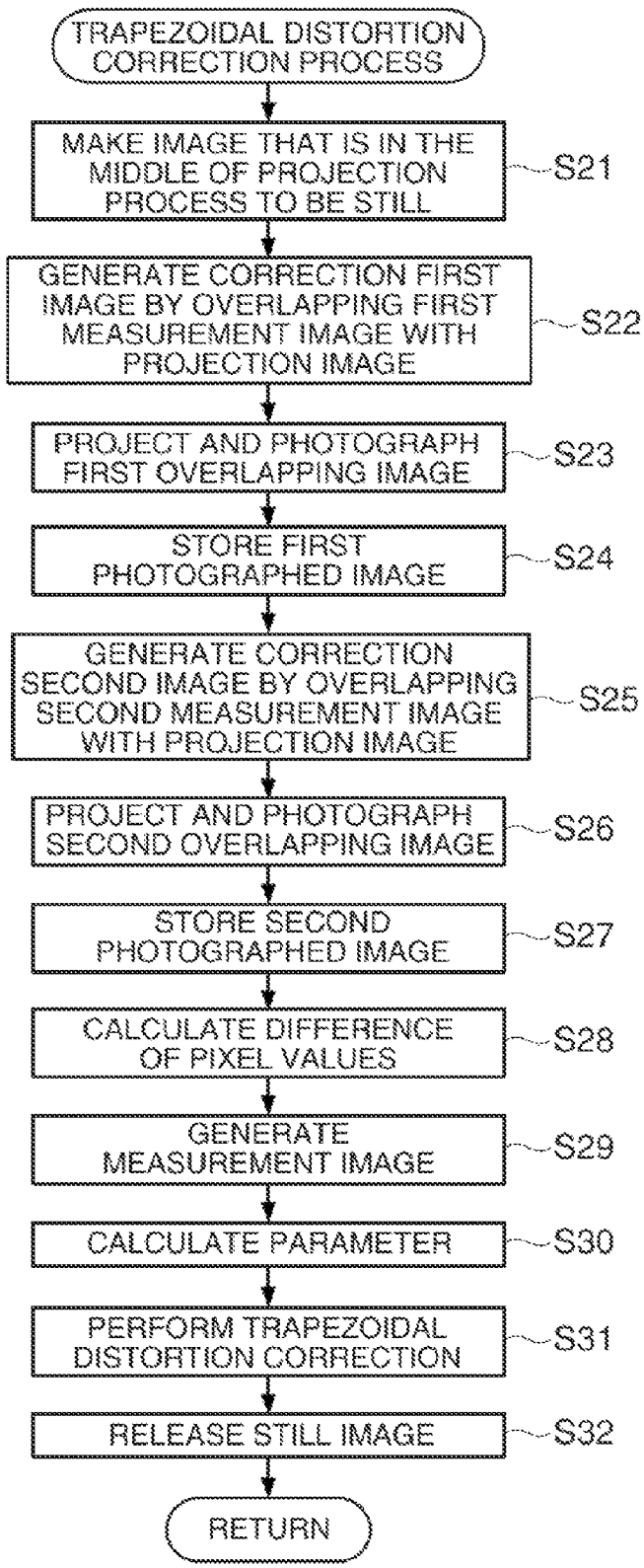
FIG. 3 is a flowchart showing a distortion correction process of the projector.

FIG. 3 is a flowchart showing a trapezoidal distortion correction process performed by the projector 100 in detail, which is illustrated in Step S12 shown in FIG. 2.

This trapezoidal distortion correction process includes a series of processes (Steps S21 to S29) for acquiring a measurement image used for performing the trapezoidal distortion correction, a process (Step S30) of acquiring a parameter which is necessary for performing the trapezoidal distortion correction based on the measurement image, and a process (Step S31) of actually correcting the trapezoidal distortion.

As shown in FIG. 3, before performing the trapezoidal distortion correction, the CPU 120, first, makes an image that is in the middle of projection still (Step S21). The CPU 120, by controlling the video processor 134, stops the display of a video signal input from the A/D conversion unit 110 to the video processor 134 and sets a frame that is in the process of being output from the video processor 134 to the liquid crystal panel driving unit 132 as a still image 300 (FIG. 5A) at specific timing. This operation is performed by transmitting a predetermined command from the CPU 120 to the video processor 134. The projection of the still image 300 is continued until a command for ending the still image projection is input to the video processor 134 from the CPU 120.

The CPU 120 reads out a first distortion detection image 310 (FIG. 4A) stored in the distortion detection image storing unit 171 of the ROM 170 and outputs the first distortion detection image 310 to the video processor 134 together with the command, thereby allowing the video processor 134 to generate a first overlapping image 315 (FIG. 5B) acquired by overlapping the still image 300 (see FIG. 3) and the first distortion detection image 310 (Step S22). Then, the CPU 120 projects the generated first overlapping image 315 onto the screen SC and allows the imaging unit 180 to capture the projection image (Step S23). This captured image is stored in the captured image memory 182 under the control of the CPU 120 (Step S24).

Figure 4A:
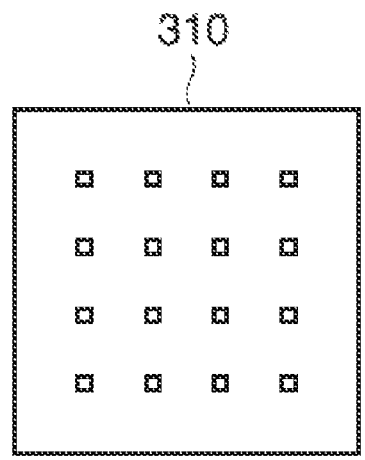
FIGS. 4A and 4B are diagrams showing examples of a distortion detection image.
Figure 4B:
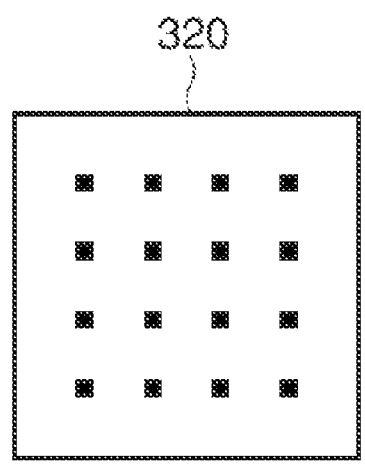

FIGS. 4A and 4B are diagrams showing examples of a distortion detection image. FIG. 4A shows the first distortion detection image 310, and FIG. 4B shows a second distortion detection image 320.

The first distortion detection image 310 illustrated in FIG. 4A as an example is an image that includes 16 white quadrangles of 4 rows×4 columns arranged to be equally spaced. In addition, the second distortion detection image 320 illustrated in FIG. 4B as an example is an image that includes 16 black quadrangles of 4 rows×4 columns arranged to be equally spaced at the same positions as those of the quadrangles of the first distortion detection image 310. These distortion detection images 310 and 320 are the same images except for the color of the quadrangles. Accordingly, by acquiring a difference between the first distortion detection image 310 and the second distortion detection image 320, a difference image in which 16 quadrangles are aligned can be acquired.

Figure 5A:
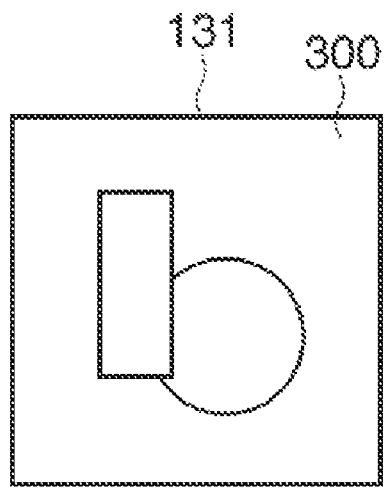
FIGS. 5A to 5D are diagrams showing examples of an image displayed on a liquid crystal panel in a distortion correction process.
Figure 5C:
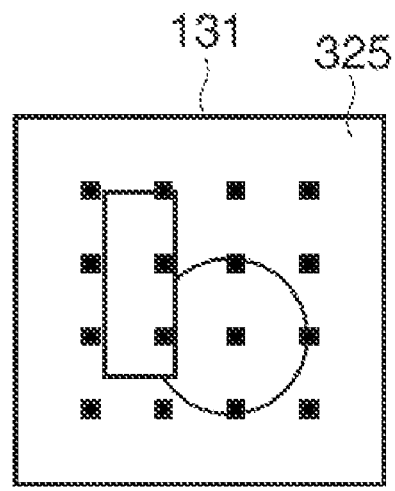
Figure 5B:
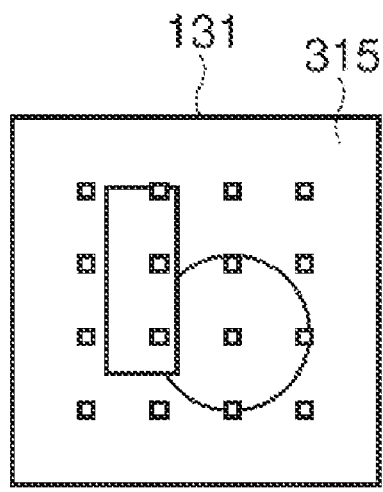
Figure 5D:
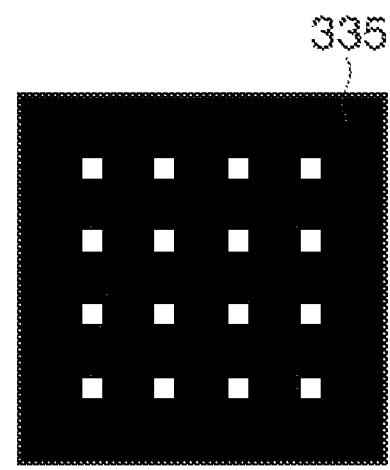

FIGS. 5A to 5D are diagrams showing examples of an image displayed on the liquid crystal panel 130 in the trapezoidal distortion correction process. FIG. 5A shows the still image 300, FIG. 5B shows the first overlapping image 315, FIG. 5C shows the second overlapping image 325, and FIG. 5D shows a differential image 335.

Figure 6A:
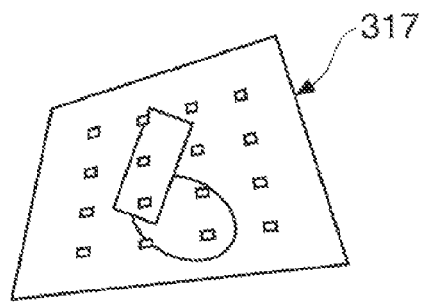
FIGS. 6A to 6C are diagrams showing examples of a captured image acquired by an imaging unit.
Figure 6B:
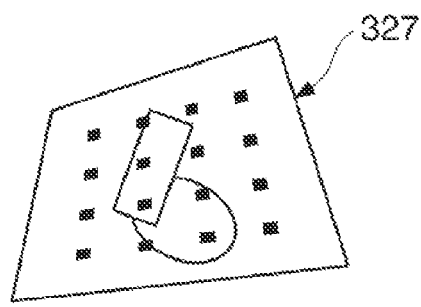
Figure 6C:
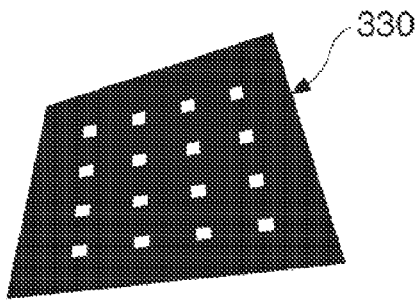

FIGS. 6A to 6C are diagrams showing examples of a captured image acquired by the imaging unit 180. FIG. 6A shows a first captured image 317 acquired by capturing the first overlapping image 315, FIG. 6B shows a second captured image 327 acquired by capturing the second overlapping image 325, and FIG. 6C shows a measurement image 330 which represents a difference between the first captured image 317 and the second captured image 327.

The still image 300 illustrated in FIG. 5A as an example is acquired by setting a frame that is in the middle of a display as a still image by using the video processor 134 under the control of the CPU 120. Before the trapezoidal distortion correction is performed after the start of projection, the still image 300 is displayed in the entire displayable area 131 of the liquid crystal panel 130.

When the first distortion detection image 310 overlaps the still image 300 under the control of the CPU 120, the first overlapping image 315 illustrated in FIG. 5B as an example is generated and is displayed on the liquid crystal panel 130. This first overlapping image 315 is an image acquired by overlapping the still image 300 and the above-described 16 white quadrangles.

The first overlapping image 315 shown in FIG. 5B is projected onto the screen SC, and a captured image acquired by capturing this projection image by using the imaging unit 180, for example, is the first captured image 317 shown in FIG. 6A. When the optical axis of the projection optical system 150 and the screen SC are not perpendicular to each other, the first captured image 317 becomes an image in which the trapezoidal distortion occurs as shown in FIG. 6A.

Subsequently, the CPU 120 acquires the second distortion detection image 320 from the distortion detection image storing unit 171 of the ROM 170 and, by controlling the video processor 134, overlaps the second distortion detection image 320 and the still image 300, thereby generating the second overlapping image 325 (Step S25). The second overlapping image 325 generated by the video processor 134 is output to the liquid crystal panel driving unit 132 under the control of the CPU 120, and the liquid crystal panel driving unit 132 draws the second overlapping image 325 on the liquid crystal panel 130. Here, after the second overlapping image 325 is projected onto the screen SC, the CPU 120 allows the imaging unit 180 to capture the projection image formed on the screen SC (Step S26). This second captured image 327 is stored in the captured image memory 182 under the control of CPU 120 (Step S27).

The second overlapping image 325 that is generated by the video processor 134 under the control of the CPU 120, for example, as shown in FIG. 5C, is an image acquired by overlapping the above-described 16 black quadrangles and the still image 300. The second overlapping image 325 shown in FIG. 5C is projected onto the screen SC, and a captured image acquired by capturing this projection image by using the imaging unit 180, for example, is the second captured image 327 shown in FIG. 6B. This second captured image 327, as shown in FIG. 6B, similarly to the first captured image 317, becomes an image in which the trapezoidal distortion occurs.

Since the first overlapping image 315 and the second overlapping image 325 are consecutively projected while the projector 100 is not moved, the same trapezoidal distortion occurs in the first captured image 317 and the second captured image 327. In addition, in a case where the CPU 120 detects that the projector 100 is moved by a predetermined distance or longer during the trapezoidal distortion correction process based on the output value of the sensor unit 175, the CPU 120 may end the trapezoidal distortion correction or may perform the process of Step S22 and after that again.

The CPU 120 reads out the first captured image 317 and the second captured image 327 that are stored in the captured image memory 182 and performs a calculation process of acquiring a difference thereof using the function of the measurement image detecting unit 122 (Step S28). By performing this process, the difference between the first captured image 317 and the second captured image 327 is acquired, and a measurement image 330 representing the difference is generated (Step S29).

As described above, the first overlapping image 315 and the second overlapping image 325 are images acquired by the distortion detection images 310 and 320 and the same still image 300. Accordingly, when a difference thereof is acquired, the color and the shading of the still image 300 included therein are offset. Accordingly, in the first captured image 317 and the second captured image 327 acquired by capturing the projection images of the first overlapping image 315 and the second overlapping image 325, the components originated from the still image 300 are common, and the same trapezoidal distortion occurs. Accordingly, the difference between the first captured image 317 and the second captured image 327 is the same as the difference between the distortion detection images 310 and 320, and, as shown in FIG. 6C, is acquired as a measurement image 330 in which 16 quadrangles are distributed on a black background.

A difference between the first overlapping image 315 and the second overlapping image 325 that are displayed on the liquid crystal panel 130, as shown in FIG. 5D, becomes a differential image 335 in which 16 white quadrangles are aligned to be equally spaced on a rectangular black background. In contrast to this, since the trapezoidal distortion occurs in the difference between the first captured image 317 and the second captured image 327 that are captured by the imaging unit 180, the difference is distorted as the measurement image 330 shown in FIG. 6C. By comparing the differential image 335 and the measurement image 330 with each other, the status of the trapezoidal distortion can be acquired based on the arrangement of 16 white quadrangles.

After acquiring the measurement image 330, the CPU 120 calculates a parameter for correcting the trapezoidal distortion based on the measurement image 330 by the trapezoidal distortion correction unit 136 (Step S30).

In Step S30, the CPU 120 performs a three-dimensional measurement process by using the function of the three-dimensional measurement unit 125. This three-dimensional measurement process is a process of detecting the three-dimensional status of a plane including the screen SC in a three-dimensional coordinate system (hereinafter, also referred to as a "lens coordinate system") in which the principal point of the zoom lens 152 of the projector 100 is set as the origin. In other words, a three-dimensional inclination of the screen SC with respect to the optical axis of the projection optical system 150 of the projector 100 is detected. In this process, the measurement image 330 is discretized, and the centers of 16 quadrangles included in the measurement image 330 are acquired as measurement points. Subsequently, the CPU 120 selects three points, which can define a plane, from among the measurement points and detects three-dimensional coordinates of the selected three measurement points in the lens coordinate system. The CPU 120 calculates an approximate plane that approximates the plane including the screen SC based on the three-dimensional coordinates of the three measurement points that have been detected.

Subsequently, the CPU 120 calculates a projection angle of projection that is an angle formed by the approximate plane of the screen plane detected in the three-dimensional measurement process and the optical axis of projection light projected from the projector 100 by using the function of the projection angle calculating unit 126. Thereafter, the CPU 120 acquires the shape of an image after correction in the displayable area 131 of the liquid crystal panel 130 based on the calculated projection angle of projection. Then, the CPU 120 calculates a transformation coefficient (parameter) that is used for transforming the shape of an image before correction in the displayable area 131 of the liquid crystal panel 130 into the shape of an image after correction.

This transformation coefficient is a coefficient when three-dimensional vector calculation is performed for information (coordinates) of the pixel position of the video signal input to the video processor 134.

The CPU 120 sets the acquired parameter at the trapezoidal distortion correction unit 136 and allows the trapezoidal distortion correction unit 136 to perform trapezoidal distortion correction (Step S31). The trapezoidal distortion correction unit 136 transforms an input digital signal by using the set parameter and outputs the transformation result to the liquid crystal panel driving unit 132. In other words, the trapezoidal distortion correction unit 136 transforms an image displayed on the liquid crystal panel 130 so as to correct the trapezoidal distortion by repeating vector calculation for the coordinates of each pixel for the digital signal input from the A/D conversion unit 110. After this trapezoidal distortion correction process is started, the CPU 120 releases the state in which the image has made still by the video processor 134, resumes projection of a video (Step S32), and ends the trapezoidal distortion correction process.

Subsequently, the re-correction process will be described.

Figure 7:
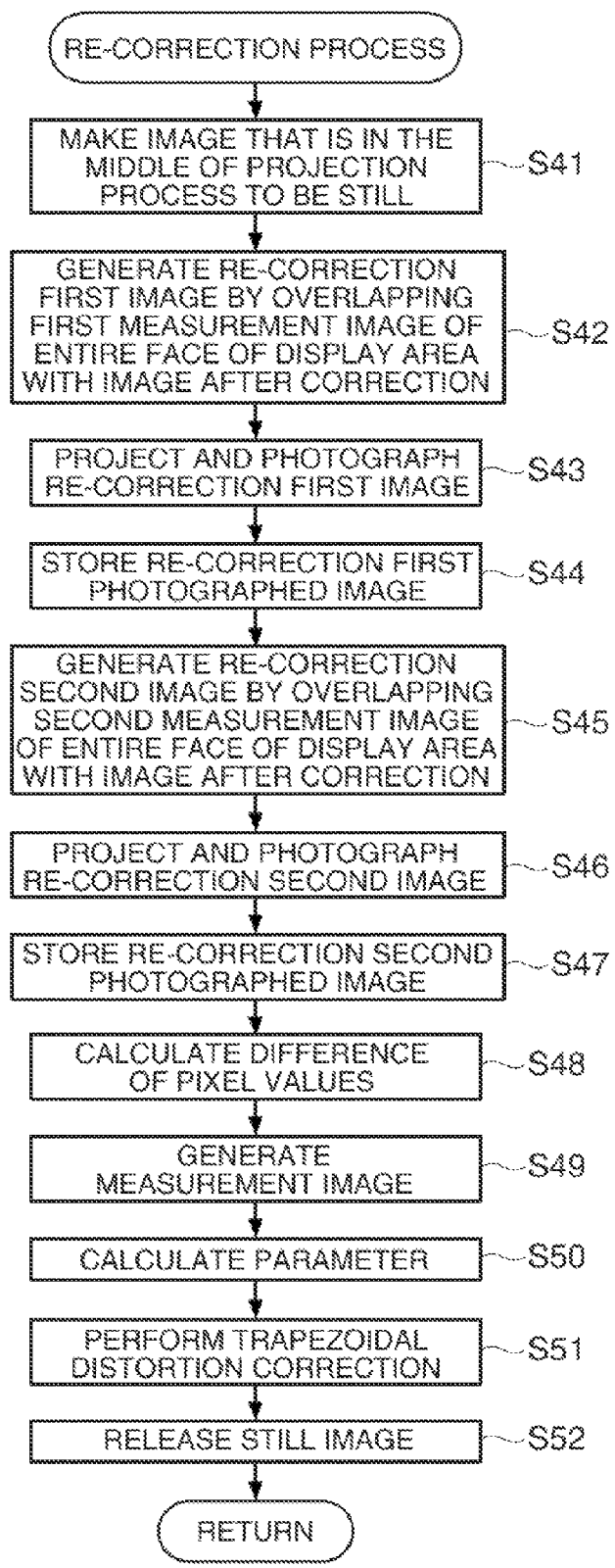
FIG. 7 is a flowchart showing a re-correction process of the projector.

FIG. 7 is a flowchart showing the trapezoidal distortion correction process, which is performed by the projector 100, illustrated in Step S14 shown in FIG. 2 in detail.

This re-correction process is a re-correction process for accurately correcting the trapezoidal distortion in a case where trapezoidal distortion is perceived again in a projection image due to a movement of the projector 100 or the like after performance of the trapezoidal distortion correction process described with reference to FIGS. 3 to 6, in other words, in a case where new correction needs to be performed after performance of the initial trapezoidal distortion correction. In this case, the coefficient (correction information) of the trapezoidal distortion correction is acquired again, and the trapezoidal distortion correction is performed based on the newly acquired coefficient.

The CPU 120, first, makes an image that is in the process of projection still (Step S41). The CPU 120, by controlling the video processor 134, stops the display of a video signal input from the A/D conversion unit 110 to the video processor 134 and sets a frame that is in the process of being output from the video processor 134 to the liquid crystal panel driving unit 132 as a still image 301 (FIG. 8A) at specific timing.

The CPU 120 reads out the first distortion detection image 310 stored in the distortion detection image storing unit 171 of the ROM 170 and allows the video processor 134 to generate a re-correction first image 314 (FIG. 8B) acquired by overlapping the still image 301 (FIG. 8A) and the first distortion detection image 310 (Step S42). Then, the CPU 120 projects the generated re-correction first image 314 onto the screen SC and allows the imaging unit 180 to capture the projection image (Step S43). This captured image is stored in the captured image memory 182 under the control of the CPU 120 (Step S44).

Figure 8A:
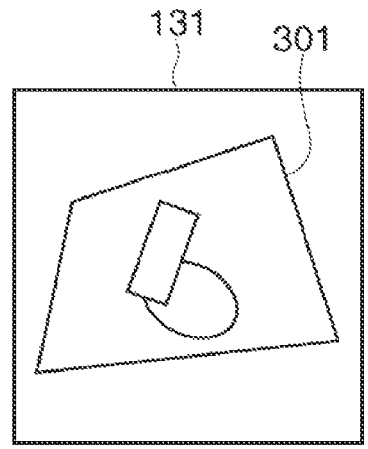
FIGS. 8A to 8D are diagrams showing examples of an image displayed on the liquid crystal panel based on the re-correction process.
Figure 8B:
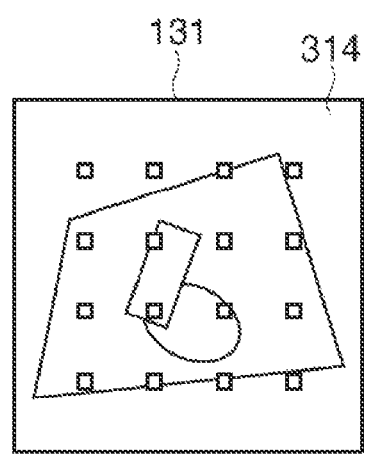
Figure 8C:
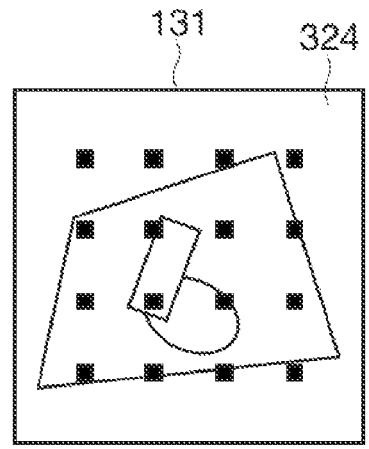
Figure 8D:
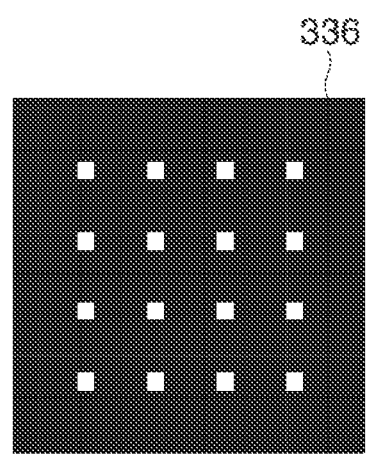

FIGS. 8A to 8D are diagrams showing examples of an image displayed on the liquid crystal panel 130 in the trapezoidal distortion correction process. FIG. 8A shows the still image 301, FIG. 8B shows the re-correction first image 314, FIG. 8C shows the re-correction second image 324, and FIG. 8D shows a differential image 336.

Figure 9A:
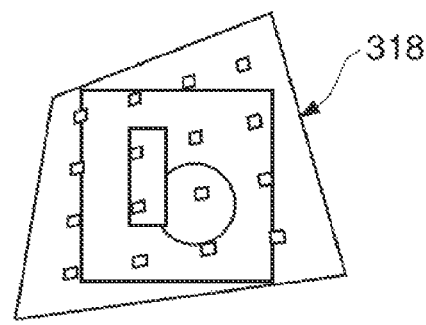
FIGS. 9A to 9C are diagrams showing examples of a captured image acquired by the imaging unit.
Figure 9B:
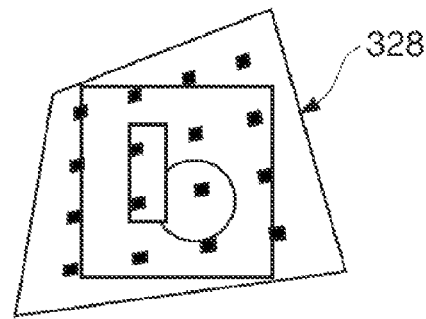
Figure 9C:
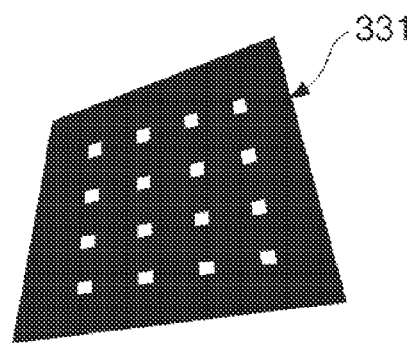

FIGS. 9A to 9C are diagrams showing examples of a captured image of the imaging unit 180. FIG. 9A shows a re-correction first captured image 318 acquired by capturing the re-correction first image 314, FIG. 9B shows a re-correction second captured image 328 acquired by capturing the re-correction second image 324, and FIG. 9C shows a measurement image 331 which represents a difference between the first captured image 318 and the second captured image 328.

The still image 301 illustrated in FIG. 8A as an example is configured as the video processor 134 sets a frame in the process of being displayed as the still image under the control of the CPU 120. Since the trapezoidal distortion correction is performed for the still image 301 by the trapezoidal distortion correction unit 136, the originally rectangular image is transformed so as to be an image having a shape other than the rectangle. In addition, while the still image 300 before the trapezoidal distortion correction, as shown in FIG. 5A, is displayed in the entire displayable area 131 of the liquid crystal panel 130, the still image after the trapezoidal distortion correction, as shown in FIG. 8A, is displayed in only a part of the displayable area 131. The reason for this is that a black space surrounding the still image 301 is generated due to the transformation performed in the trapezoidal distortion correction.

When the first distortion detection image 310 overlaps the still image 301 under the control of the CPU 120, the re-correction first image 314 illustrated in FIG. 8B as an example is generated and is displayed on the displayable area 131 of the liquid crystal panel 130. This re-correction first image 314 displayed on the liquid crystal panel 130 is acquired by overlapping the first distortion detection image 310 that has not been transformed and the still image 301 transformed by the trapezoidal distortion correction. Accordingly, the above-described 16 white quadrangles of the first distortion detection image 310 are distributed over the entire displayable area 131 to be equally spaced, and the still image 301 is transformed as shown in FIG. 8A.

The re-correction first image 314 shown in FIG. 8B is projected onto the screen SC, and a captured image acquired by capturing this projection image by using the imaging unit 180, for example, is the re-correction first captured image 318 shown in FIG. 9A. Since the trapezoidal distortion correction is performed for the still image 301, the image is projected on the screen SC as an approximately rectangular shape, and 16 white quadrangles of the first distortion detection image 310 are projected with trapezoidal distortion. Accordingly, in the re-correction first captured image 318, the still image 301 is projected in a rectangular shape, and 16 white quadrangles of the first distortion detection image 310 are distributed in a distorted trapezoidal shape.

Subsequently, the CPU 120 acquires the second distortion detection image 320 from the distortion detection image storing unit 171, and, by controlling the video processor 134, overlaps the second distortion detection image 320 and the still image 301, thereby generating the re-correction second image 324 (Step S45). The generated re-correction second image 324 is output to the liquid crystal panel driving unit 132 under the control of the CPU 120, and the liquid crystal panel driving unit 132 draws the re-correction second image 324 on the liquid crystal panel 130. Here, after the re-correction second image 324 is projected onto the screen SC, the CPU 120 allows the imaging unit 180 to capture the projection image formed on the screen SC (Step S46). This second captured image 327 is stored in the captured image memory 182 under the control of CPU 120 (Step S47).

The re-correction second image 324 that is generated by the video processor 134 under the control of the CPU 120, for example, as shown in FIG. 8C, is an image acquired by overlapping the above-described 16 black quadrangles and the still image 301. The re-correction second image 324, similarly to the re-correction first image 314, is an image acquired by overlapping the second distortion detection image 320 having a shape for which the trapezoidal distortion correction has not been performed and the still image 301 for which the trapezoidal distortion correction has been performed. The re-correction second image 324 shown in FIG. 8C is projected onto the screen SC, and a captured image acquired by capturing the projection image by using the imaging unit 180 is the re-correction second captured image 328 shown in FIG. 9B. In the re-correction second captured image 328, the still image 301 for which the trapezoidal distortion correction has been performed and the black quadrangles of the second distortion detection image 320 that are distorted so as to be distributed are reflected.

The CPU 120 reads out the re-correction first captured image 318 and the re-correction second captured image 328 that are stored in the captured image memory 182 and performs a calculation process of acquiring a difference thereof using the function of the measurement image detecting unit 122 (Step S48). By performing this process, a difference between the re-correction first captured image 318 and the re-correction second captured image 328 is acquired, and a measurement image 331 representing the difference is generated (Step S49).

The still image 301 for which the trapezoidal distortion correction has been performed is commonly included in the re-correction first image 314 and the re-correction second image 324, and accordingly, by acquiring the difference between the re-correction first image 314 and the re-correction second image 324, the color or the shading of the still image 301 are offset. Then, a differential image 336 (FIG. 8D) in which quadrangles are distributed to be equally spaced in the entire displayable area 131 is acquired. In addition, a measurement image 331, which represents a difference between the re-correction first captured image 318 and the re-correction second captured image 328 that are acquired by capturing the projection images formed on the screen SC, is acquired in which 16 quadrangles are distributes on a black background as shown in FIG. 9C.

Similarly to Step S30 shown in FIG. 3 described above, the CPU 120 calculates a parameter for the trapezoidal correction based on the measurement image 331 and the differential image 336 (Step S50). The CPU 120 sets the acquired parameter in the trapezoidal distortion correction unit 136 and allows the trapezoidal distortion correction unit 136 to perform trapezoidal distortion correction (Step S51). Since the trapezoidal distortion correction unit 136 performs the trapezoidal distortion correction based on the parameter set in Step S31 shown in FIG. 3, in step S51, the parameter set in the trapezoidal distortion correction unit 136 is changed, and the trapezoidal distortion correction is performed based on the parameter after change. After the trapezoidal distortion correction process is started, the CPU 120 allows the video processor 134 to release the state in which the image has been made still, performs trapezoidal distortion correction based on the parameter after change, resumes projection of a video (Step S52), and ends the re-correction process.

As above, in the re-correction process, the CPU 120 generates the re-correction first image 314 and the re-correction second image 324 by overlapping the still image 301 for which the trapezoidal distortion correction has been performed and the distortion detection images 310 and 320 having shapes for which the trapezoidal distortion correction process has not been performed and projects the generated re-correction images onto the screen SC. In other words, the distortion detection images 310 and 320 that are displayed on an approximately entire face of the displayable area 131 are overlapped with the still image 301, and the re-correction images 314 and 324 displayed on the approximately entire face of the displayable area 131 are projected. Then, the parameter for trapezoidal distortion correction is calculated based on a difference between the re-correction first captured image 318 and the re-correction second captured image 328 that are acquired by capturing the projection images. Accordingly, the measurement points needed for calculating the parameter can be calculated by using the first distortion detection image 310 and the second distortion detection image 320 that are displayed in the entirety of the displayable area 131.

In the re-correction process, it is possible that the distortion detection images 310 and 320 are overlapped in the shapes for which the trapezoidal distortion correction is performed with the still image 301 and are projected onto the screen SC. However, in a case where the distortion detection images 310 and 320 are projected by using the entirety of the displayable area 131, the measurement image 331 expands in a broader range on the screen SC, and accordingly, calculation of the three-dimensional inclination of the screen SC with respect to the optical axis of the projection optical system 150 through three-dimensional measurement can be performed with higher accuracy.

After the trapezoidal distortion correction is performed, there is a case where an image after the trapezoidal distortion correction is projected onto the screen SC in a full scale through the adjustment of the zoom lens 152. In such case, when the distortion detection images 310 and 320 for which trapezoidal distortion correction has not been performed are projected, the projection range of the screen SC may be exceeded. However, there is no problem in the re-correction process. In the re-correction process, the difference between the re-correction first captured image 318 and the re-correction second captured image 328 is acquired, and accordingly, even when a wall outside the screen SC is captured in the re-correction first captured image 318 and the re-correction second captured image 328, it is offset by acquiring the difference thereof and does not have influence on the calculation of the parameter for trapezoidal distortion correction. However, it is preferable that the capturing range of the imaging unit 180 covers a projection range corresponding to the entirety of the displayable area 131. Accordingly, before capturing is performed in Steps S43 and S46 shown in FIG. 7, the capturing range of the imaging unit 180 may be adjusted under the control of the CPU 120. In addition, the projection range of the re-correction images 314 and 324 projected by the re-correction process may fit into the capturing range of the imaging unit 180 by adjusting the zoom lens 152 under the control of the CPU 120.

Furthermore, in the re-correction process, a character, a symbol, an image, or the like that indicates that the re-correction process is in the middle of the process may be projected onto the screen SC so as to notify a user thereof. Hereinafter, such an example will be described.

Figure 10A:
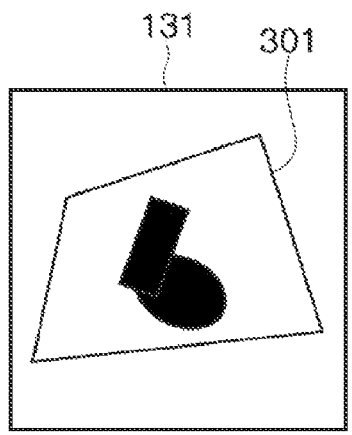
FIGS. 10A to 10D are diagrams showing other examples of an image displayed on the liquid crystal panel in the re-correction process.
Figure 10B:
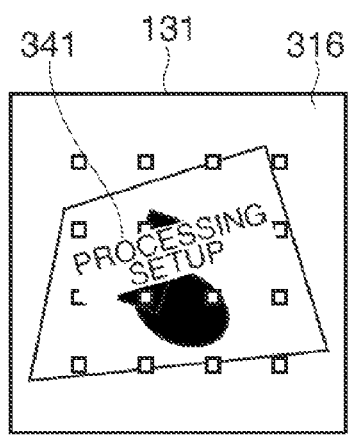
Figure 10C:
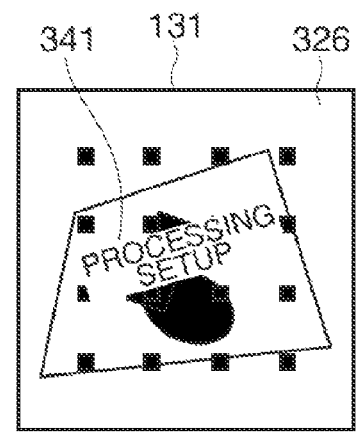
Figure 10D:
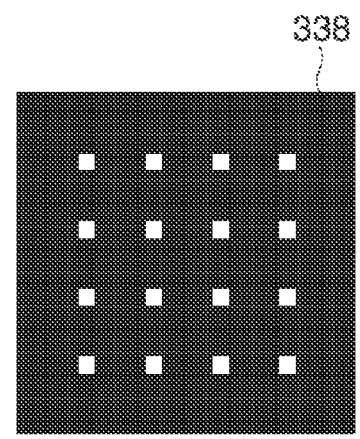

FIGS. 10A to 10D are diagrams showing other examples of an image displayed on the liquid crystal panel 130 in the re-correction process. FIG. 10A shows a still image 301, FIG. 10B shows a re-correction first image 316, FIG. 10C shows a re-correction second image 326, and FIG. 10D shows a differential image 338.

Figure 11A:
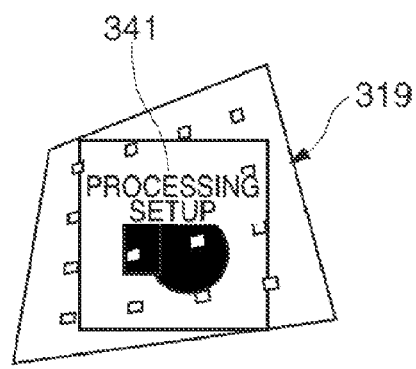
FIGS. 11A to 11C are diagrams showing other examples of a captured image acquired by the imaging unit.
Figure 11B:
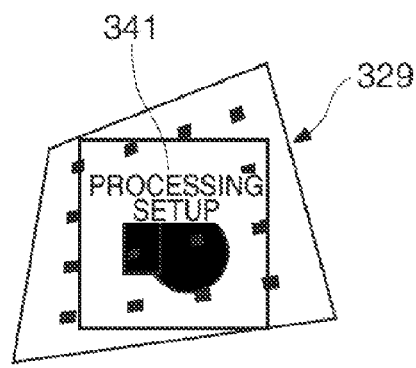
Figure 11C:
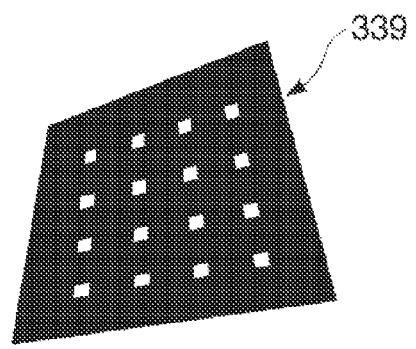

FIGS. 11A to 11C are diagrams showing other examples of a captured image acquired by the imaging unit 180. FIG. 11A shows a re-correction first captured image 319, FIG. 11B shows a re-correction second captured image 329, and FIG. 11C shows a measurement image 339.

The still image 301 shown in FIG. 10A is the same as that shown in FIG. 8A. When the first distortion detection image 310 is overlapped with the still image 301, a message 341 that indicates that the re-correction process is in the middle of the process may be further overlapped under the control of the CPU 120. This message 341, for example, is displayed as an OSD by the video processor 134 that is controlled by the CPU 120. In addition, it may be configured such that a message image is stored in the ROM 170 in advance, the CPU 120 reads out the message image and outputs the message image to the video processor 134, and the message image is overlapped with the still image 301 together with the distortion detection images 310 and 320.

When the message 341 is overlapped with the still image 301 together with the first distortion detection image 310, the re-correction first image 316 shown in FIG. 10B is generated. In addition, when the message 341 is overlapped with the still image 301 together with the second distortion detection image 320, the re-correction second image 326 shown in FIG. 10C is generated. In the re-correction images 316 and 326, the message 341, similarly to the still image 301, is in a shape for which the trapezoidal distortion correction has been performed.

When the re-correction images 316 and 326 are projected onto the screen SC and are captured by the imaging unit 180, captured images become the re-correction first captured image 319 shown in FIG. 11A and the re-correction second captured image 329 shown in FIG. 11B. As is understood from the re-correction captured images 319 and 329, the message 341, similarly to the still image 301, is projected onto the screen SC in a state in which the distortion is decreased. Since the message 341 is projected for the notification thereof to a user, trapezoidal distortion correction may be performed for the message so as to allow it to be visually recognized easily by the user, which leads to improvement of user convenience.

As above, even in a case where the message 341 is overlapped with the re-correction images 316 and 326 projected in the re-correction process, the re-correction process can be performed similarly to that shown in FIG. 7. Since the message 341 is included in the re-correction images 316 and 326 in the same pattern, a differential image of the re-correction first image 316 and the re-correction second image 326, as shown in FIG. 10D, is a differential image 338 that is the same as the differential image 336 (FIG. 8D) of a case where the message 341 is not overlapped. Accordingly, the measurement image 339 (FIG. 11C) that is similar to the measurement image 331 shown in FIG. 9C is acquired.

As described above, in the projector 100 according to the embodiment of the invention, the projection unit that projects an image toward the screen SC, the imaging unit 180 that captures the image projected onto the screen SC by the projection unit, the CPU 120 that acquires a coefficient for trapezoidal distortion correction based on the captured image of the imaging unit 180 of a case where the distortion detection images 310 and 320 are projected onto the screen SC, and the trapezoidal distortion correction unit 136 that performs distortion correction in which the image projected by the projection optical system is transformed based on the coefficient as the correction information acquired by the CPU 120 are included. In a case where correction needs to be performed again after correction that is based on the above-described coefficient is performed by the trapezoidal distortion correction unit 136, the CPU 120 can perform a re-correction process in which the distortion detection images 310 and 320 are projected by the projection optical system without being transformed by the trapezoidal distortion correction unit 136, capturing is performed by the imaging unit 180, a coefficient for the trapezoidal distortion correction is acquired based on the captured image, and the trapezoidal distortion correction is performed again based on the acquired coefficient. In other words, in a case where the projector 100 performs further trapezoidal distortion correction in a state in which the trapezoidal distortion correction is performed, the distortion detection images 310 and 320 are projected without being transformed. Accordingly, the coefficient (parameter) for the trapezoidal distortion correction can be acquired again without being influenced by the trapezoidal distortion correction that has been already performed. Thus, compared to a case where images acquired by performing trapezoidal distortion correction for the distortion detection images 310 and 320 are used as references, the coefficient can be acquired with high accuracy through a simple process.

The projection optical system includes the illumination optical system 140 including a light source and the liquid crystal panel 130 that displays an image in the displayable area 131 for modulating light emitted by the light source. The trapezoidal distortion correction unit 136 performs trapezoidal distortion correction by transforming the image displayed in the displayable area 131 of the liquid crystal panel 130. The CPU 120, in the re-correction process, displays the distortion detection images 310 and 320 in the displayable area 131 of the liquid crystal panel 130 without performing a transformation process of the trapezoidal distortion correction unit 136 and projects the images onto the screen SC.

More specifically, the CPU 120, in the re-correction process, displays the distortion detection images on the approximately entire face of the display area of liquid crystal panel 130 and projects the images on the screen SC without performing a transformation process of the trapezoidal distortion correction unit 136.

Accordingly, the re-correction process can be performed through a simpler process, the distortion detection images 310 and 320 are displayed in the displayable area 131 without being reduced and are projected onto the screen SC, whereby the trapezoidal distortion can be corrected with high accuracy. In a case where the distortion detection images 310 and 320 are projected in a large scale by using the approximately entire face of the displayable area 131, the trapezoidal distortion correction can be performed with higher accuracy.

The projector 100 projects the re-correction images 314 and 324 that are generated by overlapping the still images 300 and 301 and the distortion detection images 310 and 320 onto the screen SC and calculates the coefficient for trapezoidal distortion correction based on the difference between the re-correction captured images 318 and 328 acquired by capturing the re-correction images 314 and 324. Accordingly, the coefficient for trapezoidal distortion correction can be acquired with the influence of the colors of the still images 300 and 301 excluded while projecting the still images 300 and 301 other than the detection images. In addition, since the influence of the color of the screen SC can be excluded, in a case where re-correction images 314 and 324 are projected to exceed the screen, the captured images of the exceeded portion can be also used, whereby the trapezoidal distortion correction can be performed with higher accuracy.

Since the projector 100 performs the re-correction process trigger by any one of an operation of the operation unit 195 or a change in the output value of the sensor of the sensor unit 175, the re-correction process is appropriately performed, whereby an image without distortion can be projected. In addition, in a case where the re-correction process is performed, the video projected by the projection optical system is stopped, and the still image is fixed, whereby the coefficient for trapezoidal distortion correction can be accurately acquired even during projection of a video.

The above-described embodiment is merely an example of a specific form to which the invention is applied and is not for the purpose of limiting the scope of the invention, and the invention can be applied in a form other than that of the embodiment. For example, in the above-described embodiment, although the first distortion detection image 310 is white, and the second distortion detection image 320 is black, the two distortion detection images may differ in any one of the brightness, the color, and the saturation. In addition, although the distortion detection images 310 and 320 formed from diagrams having specific shapes arranged in 4 rows×4 columns shown in FIGS. 4A and 4B are used, the shapes of the distortion detection images are not limited thereto. For example, an image having a lattice shape may be used as the distortion detection image. In such a case, intersections of vertical lines and horizontal lines of the lines of the lattice may be set as measurement points.

In addition, in the above-described embodiment, the imaging unit 180 has been described to have a configuration including the CCD camera 181 including a CCD image sensor, the invention is not limited thereto. Thus, a CMOS sensor may be used as the image sensor of the imaging unit 180.

In addition, in the above-described embodiment, although the display unit that modulates light emitted from the light source has been described to have a configuration using three transmissive-type or reflective-type liquid crystal panels 130 corresponding to colors RGB as an example, the invention is not limited thereto. Thus, for example, the display unit may be configured by a system in which one liquid crystal panel and a color wheel are combined, a system in which three digital mirror devices (DMDs) are used, an DMD system in which one digital mirror device and a color wheel are combined, or the like. Here, in a case where only one liquid crystal panel or only one DMD is used as the display unit, a member such as a cross-dichroic prism corresponding to the composition optical system is not necessary. In addition, any configuration other than the liquid crystal panel or the DMD in which light emitted by a light source can be modulated can be employed without any problem.

Furthermore, each functional unit shown in FIG. 1 represents the functional configuration of the projector 100, and a specific mounting form is not particularly limited. In other words, hardware respectively corresponding to each functional unit may not be necessarily mounted, and it is apparent that one processor can be configured to realize functions of a plurality of functional units by executing programs. In addition, apart of the function that is realized by software in the above-described embodiment may be realized by hardware, or a part of the function that is realized by hardware in the above-described embodiment may be realized by software.

What is claimed is:

1. A projector comprising:
a projection unit that projects an image toward a projection surface;
an imaging unit that captures the image projected onto the projection surface by the projection unit;
a correction control unit that allows the imaging unit to capture a distortion detection image projected onto the projection surface by the projection unit and acquires first correction information based on the acquired first captured image; and
a distortion correction unit that performs distortion correction by transforming the image projected by the projection unit based on the first correction information acquired by the correction control unit, wherein the correction control unit, in a case where second distortion correction needs to be performed after the distortion correction unit performs first distortion correction based on the first correction information, allows the projection unit to project the distortion detection image without transforming the distortion detection image by the distortion correction unit, allows the imaging unit to capture the projected distortion detection image so as to be acquired as a second captured image, acquires second correction information based on the second captured image, and allows the distortion correction unit to perform the second distortion correction based on the second correction information.

2. The projector according to claim 1, wherein the projection unit includes a light source and a display unit that displays an image in a display area for modulating light emitted by the light source, wherein the distortion correction unit performs the distortion correction by transforming the image displayed in the display area of the display unit, and wherein the correction control unit, in the second distortion correction, displays the distortion detection image in the display area of the display unit without transforming the distortion detection image by using the distortion correction unit and projects the distortion detection image onto the projection surface.

3. The projector according to claim 2, wherein, in the second distortion correction, the correction control unit displays the distortion detection image on an approximately entire face of the display area of the display unit without transforming the distortion detection image by using the distortion correction unit and projects the distortion detection image onto the projection surface.

4. The projector according to claim 1, wherein, in the second distortion correction, the correction control unit overlaps a notification display that includes a character, a symbol, or an image used for notification of the second distortion correction with the distortion detection image in a state in which the distortion correction is performed for the notification display by the distortion correction unit and allows the projection unit to project an overlapped image.

5. The projector according to claim 1, wherein the correction control unit acquires the first correction information and the second correction information based on a difference between a first captured image that is captured by the imaging unit in a case where a predetermined image and the first distortion detection image are overlapped so as to be projected onto the projection surface and a second captured image that is captured by the imaging unit in a case where the predetermined image and the second distortion detection image are overlapped so as to be projected onto the projection surface.

6. The projector according to claim 1, further comprising:
at least any of an operation unit including operation parts, an acceleration sensor that detects acceleration of the projector, and a gyro sensor that detects a direction of the projector, wherein the correction control unit performs the second distortion correction, triggered by any of an operation of the operation parts, a change in an output value of the acceleration sensor, and a change in an output value of the gyro sensor.

7. The projector according to claim 1, wherein, in a case where the second distortion correction is performed during projection of a moving image that is performed by the projection unit, fixes an image that is projected by the projection unit.

8. A method of controlling a projector that projects an image toward a projection surface, the method comprising:
projecting a distortion detection image onto the projection surface;
acquiring a first captured image by capturing the distortion detection image projected onto the projection surface;
acquiring first correction information based on the captured image;
performing first distortion correction, in which the image projected by the projector is transformed, based on the first correction information;
projecting the distortion detection image without transforming the distortion detection image in a case where second distortion correction needs to be performed after performing the first distortion correction based on the first correction information,
capturing the projected distortion detection image so as to be acquired as a second captured image,
acquiring second correction information based on the second captured image, and
performing second distortion correction based on the second correction information.

9. The method according to claim 8, wherein the projector includes a light source and a display unit that displays an image in a display area for modulating light emitted by the light source, wherein the distortion correction is performed by transforming the image displayed in the display area of the display unit, and wherein, in performing the second distortion correction, the distortion detection image is displayed in the display area of the display unit without transforming the distortion detection image by using the distortion correction unit, and the distortion detection image is projected onto the projection surface.

10. The method according to claim 9, wherein, in performing the second distortion correction, the distortion detection image is displayed on an approximately entire face of the display area of the display unit without transforming the distortion detection image by using the distortion correction unit, and the distortion detection image is projected onto the projection surface.

11. The method according to claim 8, wherein, in performing the second distortion correction, a notification display that includes a character, a symbol, or an image used for notification of the second distortion correction is overlapped with the distortion detection image in a state in which the distortion correction is performed for the notification display by the distortion correction unit, and an overlapped image is projected by the projection unit.

12. The method according to claim 8, wherein the first correction information and the second correction information are acquired based on a difference between a first captured image that is captured by the imaging unit in a case where a predetermined image and the first distortion detection image are overlapped so as to be projected onto the projection surface and a second captured image that is captured by the imaging unit in a case where the predetermined image and the second distortion detection image are overlapped so as to be projected onto the projection surface.

13. The method according to claim 8, wherein the projector further includes: at least any of an operation unit including operation parts, an acceleration sensor that detects acceleration of the projector, and a gyro sensor that detects a direction of the projector, and wherein the second distortion correction is performed, triggered by any of an operation of the operation parts, a change in an output value of the acceleration sensor, and a change in an output value of the gyro sensor.

14. The method according to claim 8, wherein, in a case where the second distortion correction is performed during projection of a moving image, an image that is projected is fixed.

* * * * *